Figure 1:
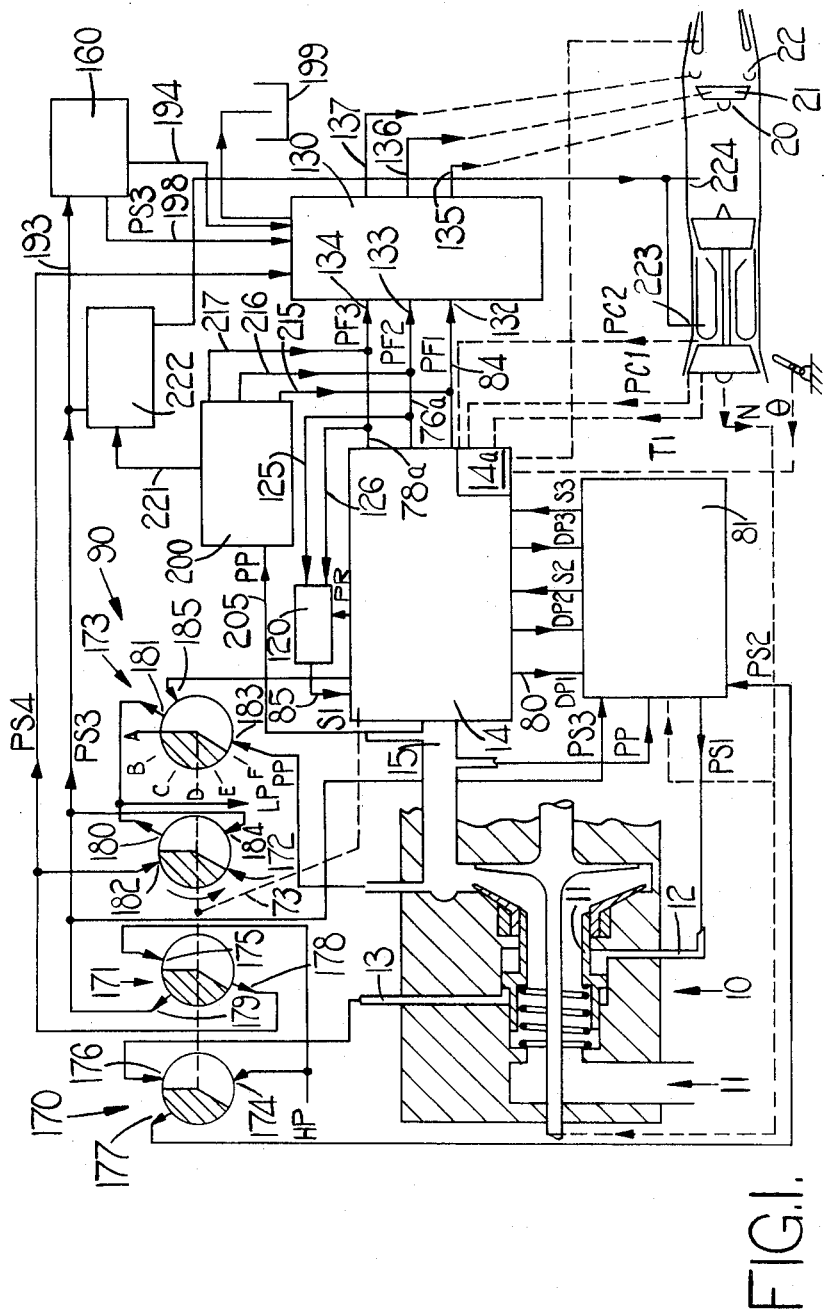

United States Patent [19]

Lewis

[11] 3,857,241

[45] Dec. 31, 1974

[54] FUEL CONTROL APPARATUS FOR GAS TURBINE ENGINE REHEAT SYSTEMS

[75] Inventor: Geoffrey Arthur Lewis, Solihull, England

[73] Assignee: Lucas Aerospace Limited, Birmingham, England

[22] Filed: Apr. 6, 1973

[21] Appl. No.: 348,634

[30] Foreign Application Priority Data
June 21, 1972  Great Britain .................. 29000/72

[52] U.S. Cl. .............. 60/243, 60/241, 60/39.28 R, 60/39.82 L, 60/261
[51] Int. Cl. ........................... F02c 9/06, F02c 9/08
[58] Field of Search ........ 60/241, 243, 39.28 R, 261

[56] References Cited
UNITED STATES PATENTS

| | | | |
|---|---|---|---|
| 3,293,847 | 12/1966 | Rogers et al. ..................... | 60/241 X |
| 3,293,856 | 12/1966 | Tyler ............................... | 60/241 X |
| 3,648,460 | 3/1972 | Johnson et al. .................. | 60/39.28 R |
| 3,714,784 | 2/1973 | Glaze et al. ...................... | 60/243 X |

Primary Examiner—Carlton R. Croyle
Assistant Examiner—Robert E. Garrett
Attorney, Agent, or Firm—Holman & Stern

[57] ABSTRACT

A fuel control apparatus for a gas turbine engine reheat system having a plurality of burners has three variable metering orifices responsive to engine operating parameters to supply fuel to the respective burners, and three throttle valves downstream of the respective burners. The throttle valves are respectively responsive to first, second and third signal pressures. The second and third signal pressures are dependent on the pressures downstream of the second and third metering orifices respectively. A device is provided for selecting the first signal pressure from which ever of the pressures downstream of the second and third throttle valves, or a reference pressure, is the highest.

4 Claims, 10 Drawing Figures

FUEL CONTROL APPARATUS FOR GAS TURBINE ENGINE REHEAT SYSTEMS

This invention relates to fuel control apparatus for gas turbine engine reheat systems.

According to the invention a fuel control apparatus for a gas turbine engine reheat system having a plurality of burners comprises first, second and third variable metering orifices, in parallel for controlling fuel flow to first, second and third reheat burners respectively, said variable metering orifices including control members positioned by servo pressure signals which are responsive to operating parameters of the engine and which are derived from the pressure upstream of said metering orifices and from a reference pressure, first, second and third throttle valves between said first, second and third metering orifices respectively and the associated burners, said first, second and third throttle valves being respectively responsive to first, second and third signal pressures, said second and third signal pressures being respectively dependent on the pressures downstream of the second and third metering orifices respectively, and selector means for providing said first signal pressure from whichever of the pressures downstream of said second and third throttle valves or said reference pressure is the highest.

Figure 2:
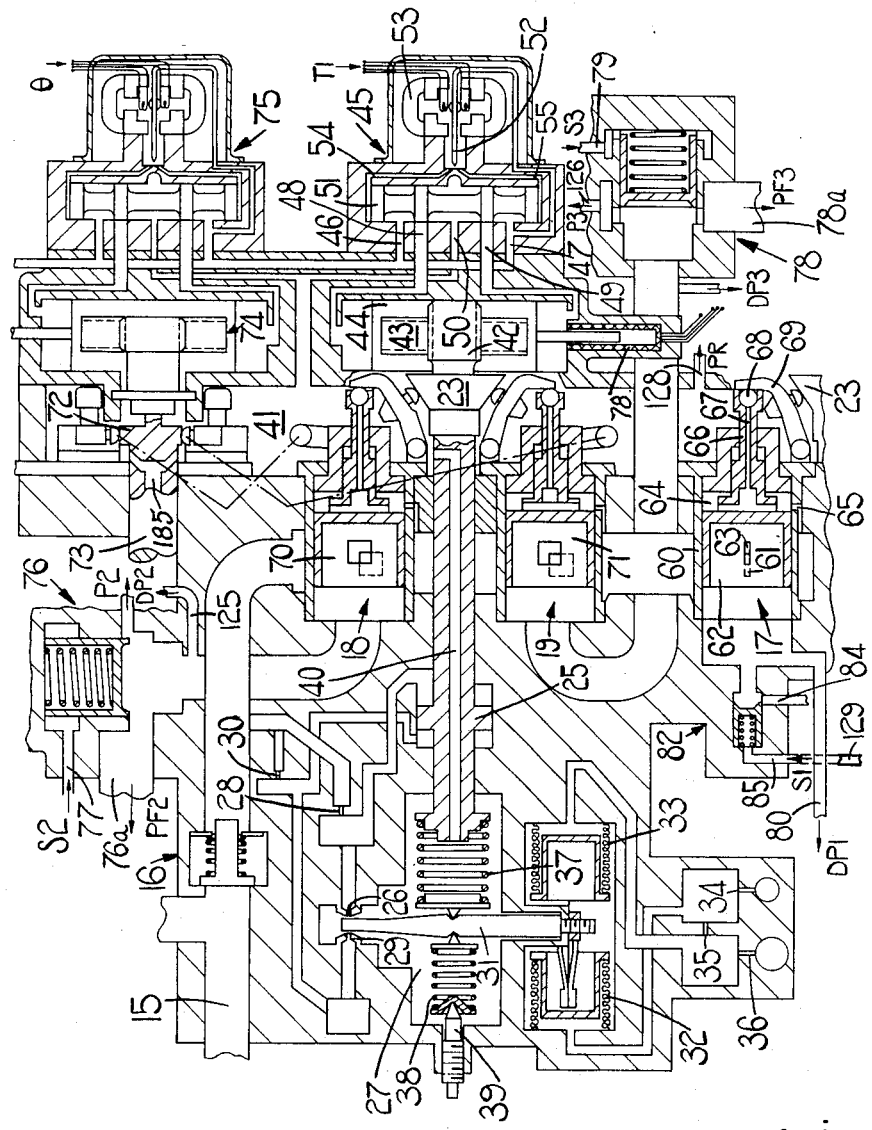
Figure 3:
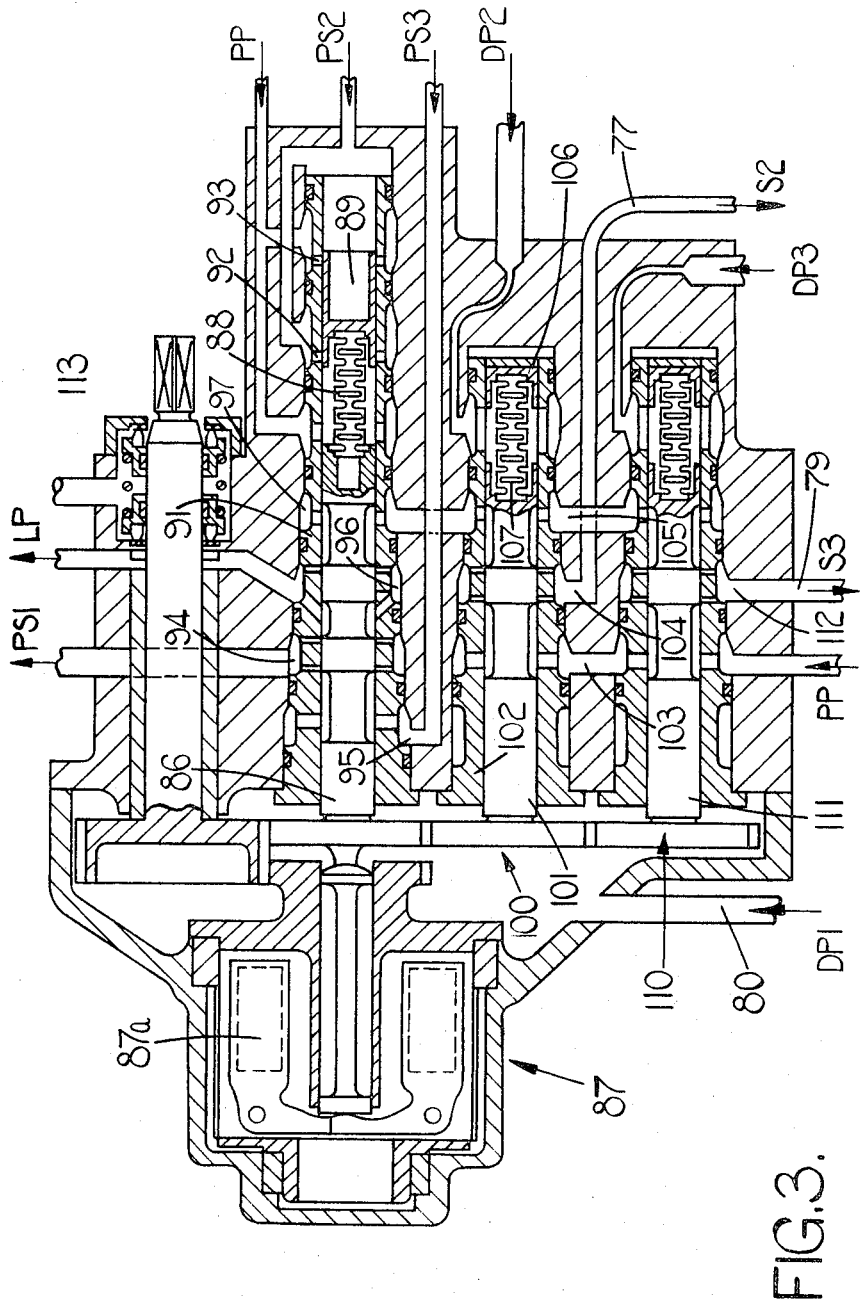
Figure 4:
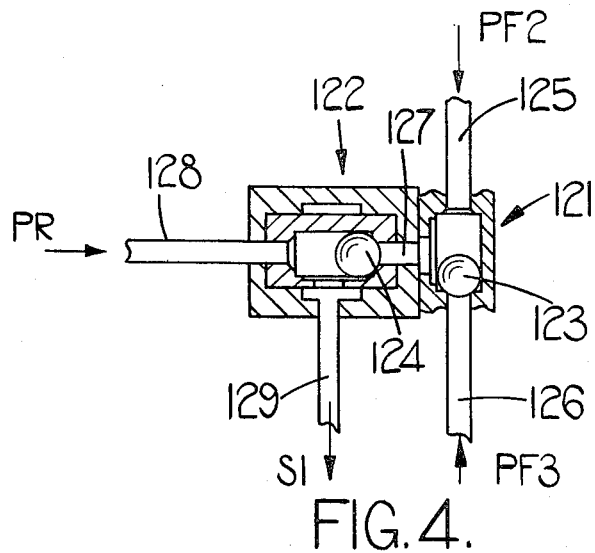
Figure 6:
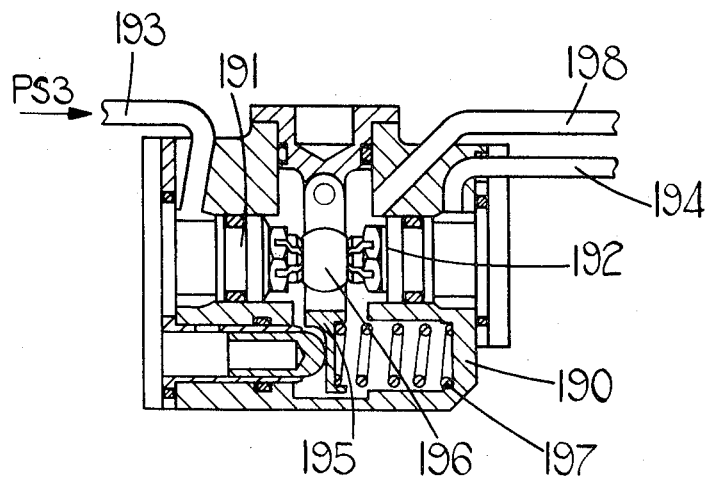
Figure 5:
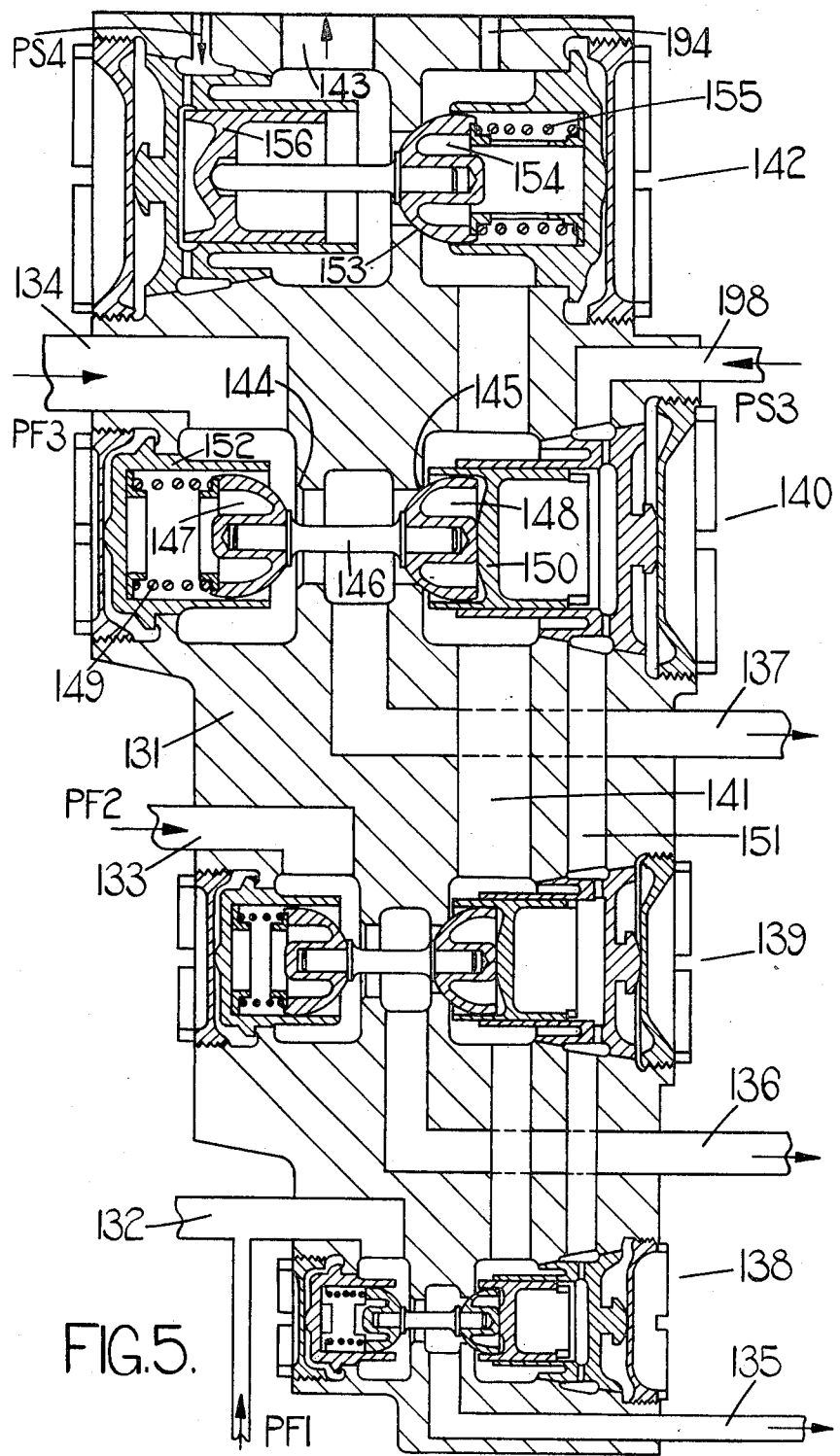
Figure 7:
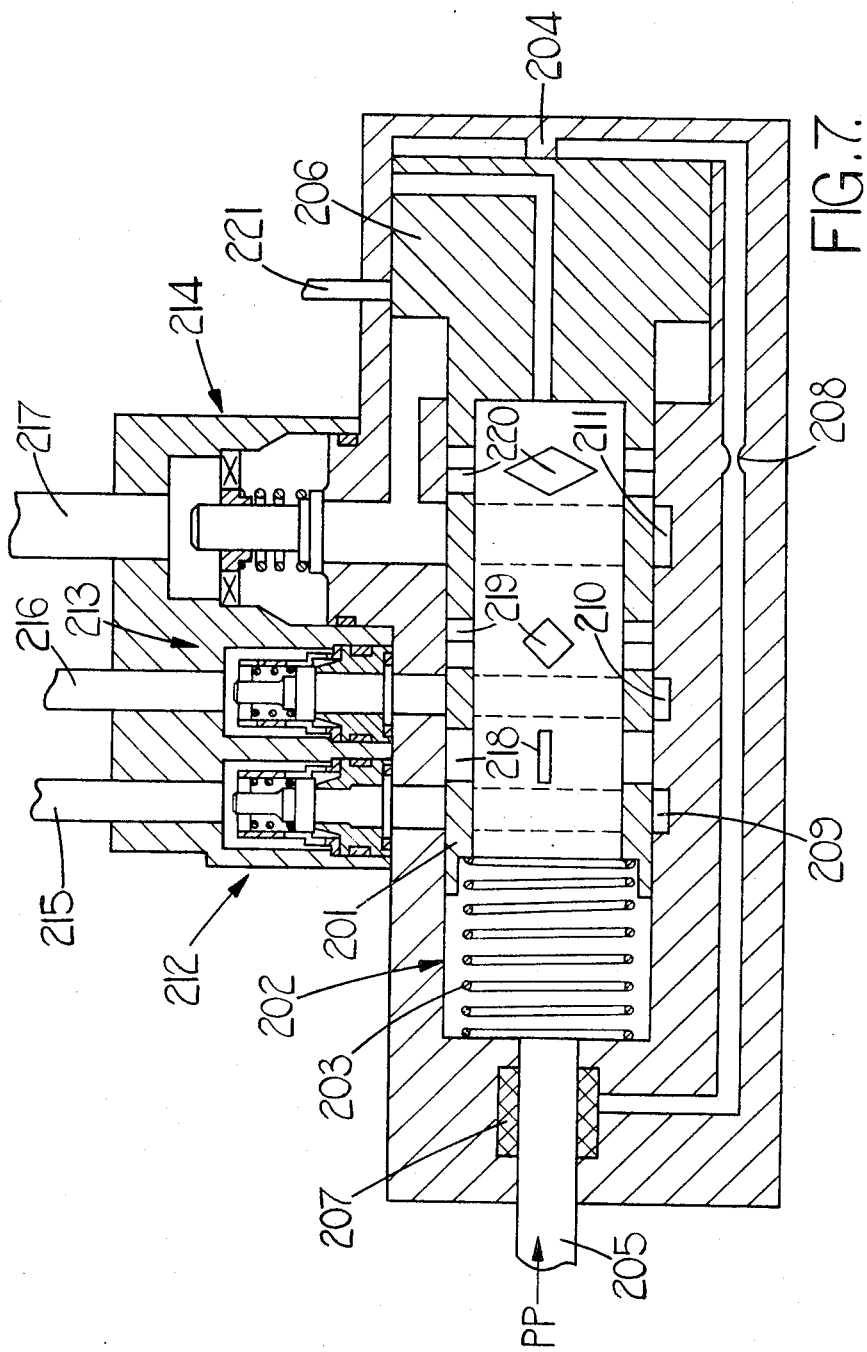
Figure 8:
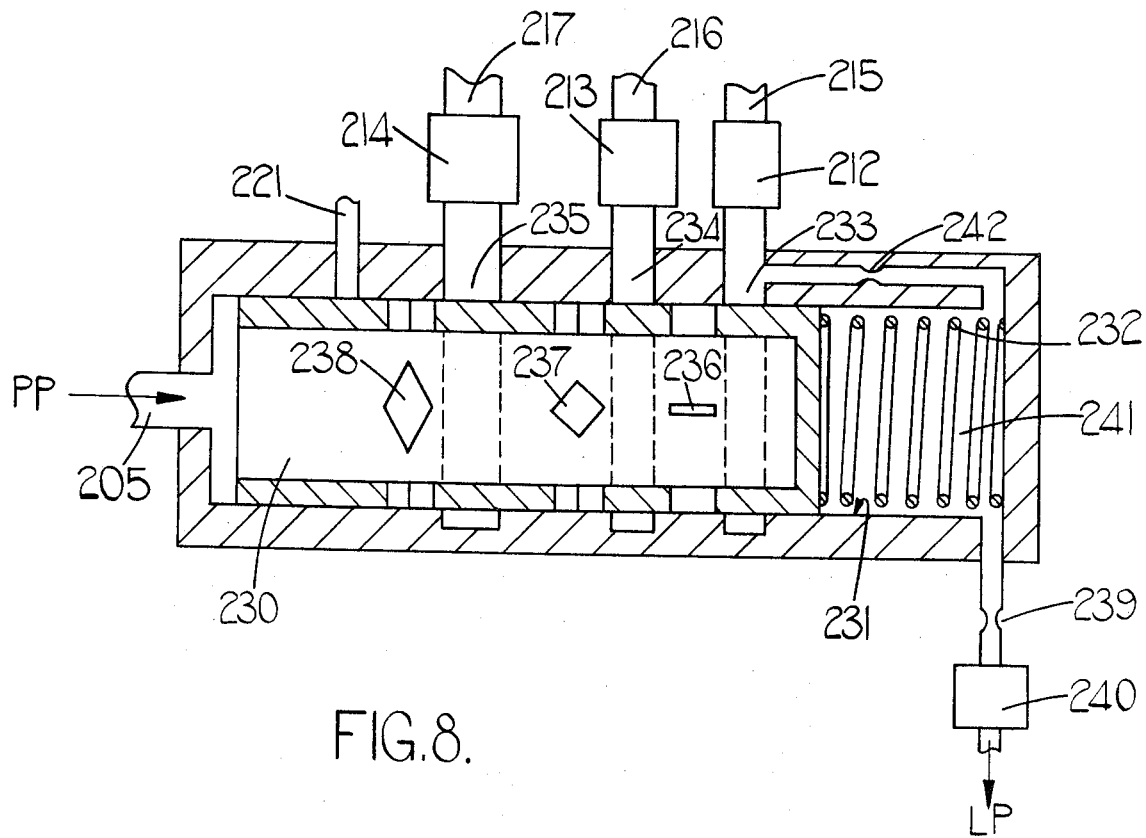
Figure 10:
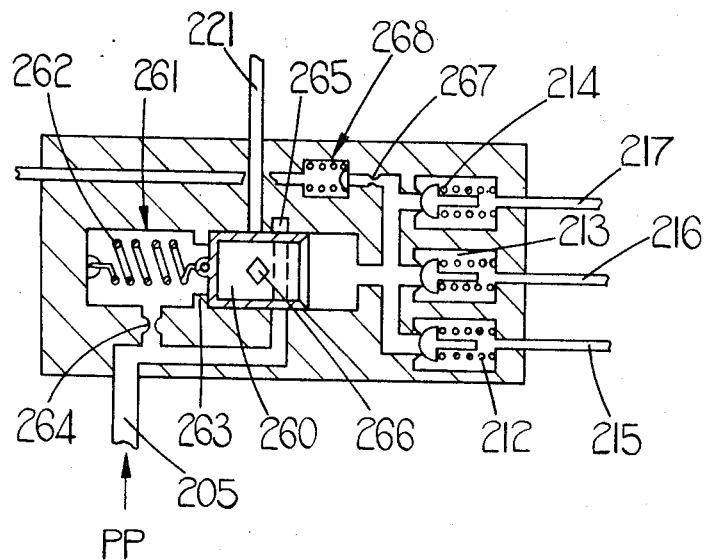
Figure 9:
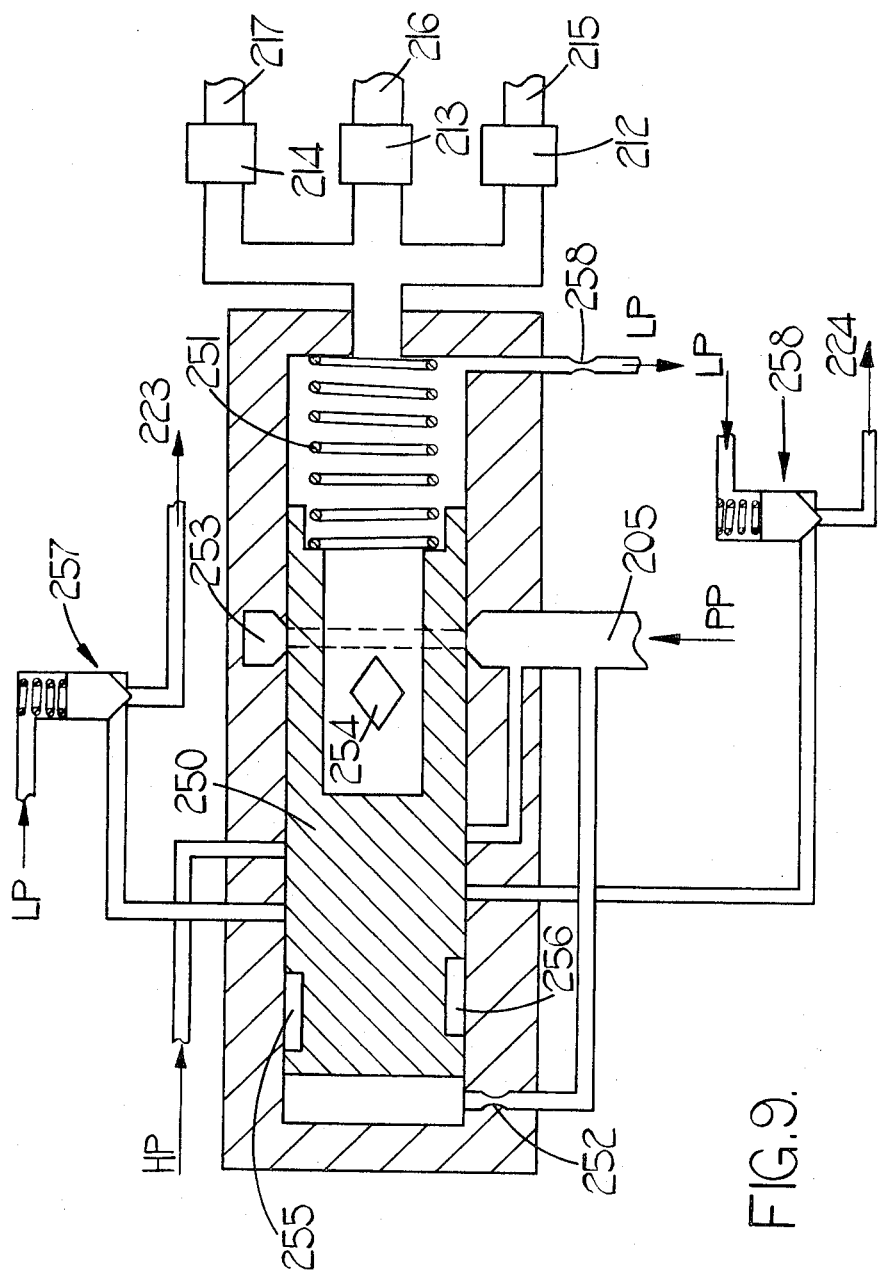

An example of a fuel control apparatus according to the invention will now be described with reference to the accompanying drawings:

FIG. 1 is a block diagram of the apparatus as a whole,

FIG. 2 shows diagrammatically a variable metering assembly forming part of the apparatus, FIG. 3 shows diagrammatically a servo pressure control arrangement forming part of the apparatus, FIG. 4 shows a selector valve arrangement forming part of the apparatus, FIG. 5 shows diagrammatically a distributor arrangement forming part of the apparatus, FIG. 6 shows diagrammatically a relay valve arrangement forming part of the apparatus, FIG. 7 shows diagrammatically a priming arrangement forming part of the apparatus, FIG. 8 shows an alternative form of priming arrangement, FIG. 9 shows a further form of priming arrangement, and FIG. 10 shows yet another form of priming arrangement.

Referring firstly to FIG. 1 the apparatus has a centrifugal vapour core fuel pump 10 driven by the engine. Pump 10 is of the kind which includes a throttle 11 responsive to a servo pressure signal PS1 applied via a passage 12 to increase pump delivery. This servo pressure signal PS1 is derived in a manner later to be described. Throttle 11 is also responsive to a further servo pressure signal PS2 in a passage 13 which opposes the pressure in passage 12.

A fuel metering assembly 14 includes an electrical control arrangement 14a. The hydraulic parts of assembly 14 are shown in greater detail in FIG. 2. Assembly 14 has an inlet 15 connected to the outlet of pump 10. Inlet 15 communicates via a non-return valve 16 with three variable metering devices 17, 18, 19 arranged in parallel to regulate fuel flow to a primary burner 20, a gutter 21 and a collander 22 respectively of the engine reheat system (FIG. 1).

The metering assembly 14 includes a first control means in the form of a three-dimensional cam 23 which is fixedly secured to the rod 24 of a piston 25. Cam 23 is formed with a series of profiles which correspond to functions of compressor intake temperature T1 for a number of values of compressor delivery pressure $PC_2$. Piston 25 is subjected on opposite sides to servo pressures derived from the pressure at the inlet 15. One side of piston 25 communicates via a valve 26 with a chamber 27 and also via a restrictor 28 with the downstream side of valve 16. Restrictor 28 and valve 26 thus provide a variable fluid pressure potentiometer arrangement.

The other side of piston 25 communicates via a valve 29 with chamber 27 and also via a resistor 30 with the downstream side of valve 16, valve 29 and restrictor 30 providing a further variable fluid pressure potentiometer. Closure members for valves 26, 29 are provided by a single lever 31 movable in opposite directions by bellows 32, 33 respectively.

Bellows 32 is responsive to an air pressure intermediate a pair of restrictors 34, 35 and derived from the intake pressure $PC_1$ of the engine compressor. Bellows 33 is responsive to an air pressure intermediate restrictor 35 and a further restrictor 36, and derived from the engine compressor delivery pressure $PC_2$. A spring 37 is engaged between lever 31 and an adjacent end of piston stem 24. A further spring 38 is engaged between lever 31 and an adjustable stop 39 on assembly 14. Chamber 27 communicates via an axial passage 40 in stem 24 with a further chamber 41 in which cam 23 is located. In use, for a given difference of pressure $PC_2$ and $PC_1$, there will be a corresponding equilibrium position of piston 25, and hence a corresponding axial position of cam 23.

Cam 23 is mounted on a pinion 42 so as to be axially slidable but non-rotatable relative to pinion 42. Pinion 42 meshes with a rack 43 which forms part of a piston 44. Piston 44 is responsive to the operation of an electrically operated servo-control valve arrangement 45 having a pair of interconnected inlet ports 46, 47, and a pair of outlet ports 48, 49, and an exhaust port 50. Valve arrangement 45 includes electrical linear transducer 78 which is responsive to the position of piston 44.

A valve spool 51 is axially movable in response to pressure signals at its opposite ends, these signals being derived from the pressure at port 47 by a nozzle 52 pivotally movable by a torque motor 53 so as to be alignable with either of a pair of passages 54, 55 through which pressure signals are applied to the respective ends of valve spool 51.

The electrical signals from arrangement 14a which are applied to torque motor 53 are derived from the engine compressor intake temperature T1, and the output from transducer 78. The angular position of cam 23 is thus dependent on temperature T1.

Variable metering devices 17, 18, 19 are angularly spaced about the axis of cam 23. In order that this arrangement may be portrayed diagrammatically in FIG. 2, a part of cam 23 is shown repeated adjacent the device 17.

Device 17 has a sleeve 60 with a port 61 which communicates with inlet 15. A piston control element 62 is slidable in sleeve 60 and includes a port 63 which cooperates with port 61 to provide a variable metering orifice. Control element 62 defines within sleeve 60 a chamber 64 which communicates with inlet 15 through a restrictor 65. Element 62 includes a stem 66 having a bore 67 which communicates with chamber 64. A ball closure member 68 is captive on stem 66 and is operable to shut off bore 67.

A cam follower 69 is pivotally mounted on sleeve 60 and engages cam 23. Control element 62 is urged to the right, as seen in FIG. 1, by the pressure downstream of ports 61, 63. This rightward movement is resisted by the pressure in chamber 64. If ball 68 is allowed to open by cam follower 69, the pressure in chamber 64 falls and element 62 moves to reduce fuel flow through device 17. With ball 68 shut the pressure in chamber 64 exceeds that downstream of ports 61, 63 and arrests element 62. Control element 62 thus acts as a follow-up servo piston responsive to the position of cam follower 69, which is in turn responsive to pressure $PC_2$, and temperature T1.

Devices 18 and 19 are generally similar to device 17 and include respective piston control elements 70, 71. Elements 70, 71 are, however, also rotatable within their associated sleeves. An edge cam 72 is secured to a shaft 73 which extends into chamber 41. Cam followers 72a are keyed to elements 70, 71 and are biased into engagement with cam 72. Shaft 73 is rotatable by a rack and pinion arrangement, 74 controlled by an electrically operated servo-valve arrangement 75, identical with valve arrangement 45 described above. Electrical signals applied to servo-valve 75 are dependent on the position $\theta$ of a power demand control for the engine. control elements 70, 71 are thus responsive to pressure $PC_2$, temperature T1 and control position $\theta$.

The fuel pressure DP1 immediately downstream of device 17 communicates via a passage 80 with a servo pressure control arrangement 81 (FIG. 1) shown in detail in FIG. 3. The downstream side of device 17 also communicates with a throttle valve 82 which has a spring-loaded piston control element 83 responsive to pressure DP1 and to a servo pressure S1 to regulate fuel flow from device 17 to an outlet passage 84. Servo pressure S1 is obtained in a manner later to be described and is applied to element 83 via a passage 85.

Downstream of device 18 is a throttle valve 76 having an outlet 76a and a piston control element biased against the pressure DP2 downstream of device 18 by a spring and by a servo pressure signal S2, derived in a manner to be described and applied via a passage 77. Downstream of device 19 is a throttle valve 78 identical with valve 77 and having an outlet 78a. The piston control element of valve 78 is responsive to the pressure DP3 downstream of device 19 and also to a servo pressure S3 derived in a manner to be described and applied via a passage 79.

Arrangement 81 has a valve spool 86 urged in one direction by the delivery pressure PP of pump 10 and in the opposite direction by the pressure DP1 and by a governor mechanism 87 responsive to the engine speed. Valve spool 86 is coupled by a torsionally stiff spring 88 to an auxiliary piston 89 whose side remote from spool 86 communicates via a sequence valve arrangement 90 (later to be described) and via passage 13 with the pressure PS2 on pump throttle 11. Auxiliary piston 89 and spool 86 slide in a sleeve 91 provided with ports 92, 93 which respectively communicate with pressure PS2 and with pump delivery pressure PP. The ports 92, 93 are axially spaced by less than the length of piston 89 so that at the rightward end of its travel (as seen in FIG. 3) piston 89 is subjected on both sides to pressure PS2, and the leftward end of its travel to pressure PP on both sides. The force due to the difference between pressures PP and PS2, and applied via spring 88 to spool 86, is thus limited.

Sleeve 91 also has a port 94 communicating with pressure PS1 via passage 12, a port 95 communicating with a servo pressure PS3, derived via valve arrangement 90, a port 96 communicating with a low pressure LP, which is conveniently the output pressure of a boost pump, not shown, in a fuel tank associated with the engine. Port 94 communicates with the bore of sleeve 91 via a pair of restricted passages. The arrangement is such that in a mid-position of spool 86 both port 95 and port 96 communicate with port 94 via the respective restricted passage, which thus act as a fluid potentiometer.

An increase in pump delivery pressure PP urges spool 86 to the left, permitting increased flow between ports 94, 96 and decreased flow between ports 94, 95. If servo pressure PS3 is high, servo pressure PS1 falls and throttle 11 in pump 10 moves to reduce fuel flow. This movement causes a fall in pressure PS2 which is transmitted via valve arrangement 90 to urge piston 89 to the right to oppose movement of spool 86. Piston 89 thus provides a position feedback until pump delivery pressure PP has risen sufficiently to restore an equilibrium condition. An increase in engine speed N or in pressure DP1 similarly causes pump delivery pressure PP to be increased. Pump delivery pressure PP at inlet 15 of metering assembly 14 is thus varied to maintain the difference between the pressures DP1 and PP substantially constant for a given engine speed, this pressure difference being variable with engine speed. The weights 87a of the governor mechanism 87 have a relatively low specific gravity, whereby, when a denser fuel is used, the effect of engine speed on spool 86 is reduced.

Sleeve 91 includes a further port 97 which is normally in communication with port 96, but which is shut off by the valve spool 86 when the latter has moved sufficiently to the right to shut off port 96 from port 94.

Arrangement 81 also includes a spool valve 100 having a spool 101 responsive to pressure DP1, and to pressure DP2 which is obtained, as above described, from metering assembly 14 and opposes pressure DP1. Surrounding spool 101 is a sleeve 102 having a port 103 communicating with pump delivery pressure PP, a port 104 communicating via passage 77 with throttle valve 76 in metering assembly 14, to apply servo pressure S2 thereto, and a port 105 communicating with port 97 and hence normally with low pressure.

A piston element 106 is coupled to spool 101 by a torsionally stiff spring 107. By virtue of leakage around piston element 106 the latter acts as a dashpot to slow movement of spool 101.

A further spool valve 110 is substantially identical with valve 100 and has a spool 111 movable in response to pressure DP1 and to a pressure DP3 obtained, as above, described from the downstream side of metering device 19 in arrangement 14, to control the value of servo pressure S3 at a port 112. Port 112 communicates via passage 79 with throttle valve 78 in arrangement 14.

Spools 86, 101, 111 and governor 87 are rotated via a gear train by a shaft driven by the engine.

Associated with metering assembly 14 is a shuttle valve arrangement 120, shown diagrammatically in detail in FIg. 4. Arrangement 120 comprises a pair of shuttle valves 121, 122 having respective ball control members 123, 124. Valve 121 is connected by passages 125, 126 to pressures PF2, PF3 on the downstream sides of the respective throttle valves 76, 78 in assembly 14. Valve 123 has an outlet 127 which forms one inlet of valve 122. the other inlet of valve 122 communicates via a passage 128 with the pressure PR in chamber 41 in assembly 14. The outlet of valve 122 communicates via a passage 129 with throttle valve 82 in assembly 14. The pressure in passage 129 provides servo pressure S1. Pressure S1 is thus equal to whichever of pressures PR, PF2 or PF3 is the largest.

When the engine reheat system is in use, fuel is supplied by the pump 10 to the assembly 14 and passes via a device 17 and throttle valve 82 to passage 84, and thence via a distributor arrangement 130, later to be described in detail with reference to FIG. 5, to the primary burners of the reheat system.

The output pressure PP of pump 10 is controlled as above described to maintain pressure DP1 substantially constant for a given engine speed and fuel density. A rise in pressure DP1 urges spool 101, in arrangement 81, to the right, causing the value of pressure S2 to rise towards pump delivery pressure PP. Throttle valve 76 progressively closes until pressure DP2 has risen to equal DP1, restoring equilibrium conditions. Similarly, a rise in pressure DP2 moves spool 101 to the left and throttle valve 76 opens until equilibrium is restored. Spool valve III in arrangement 81 operates similarly to maintain pressure DP3 equal to pressure DP1.

Valve 82 in metering assembly 14 acts as a pressurising valve. The springs in valves 76, 78 provide only light preloads to ensure that these valves are shut when the system is closed down. The spring in valve 82 is such that, in the absence of servo pressure S1, pressure DP1 is just sufficient to operate the spools 86, 101, 111 in the servo pressure control arrangement 81. At low flows, therefore, the system pressure is low and pumping power loss is a minimum.

A higher rates of reheat fuel flow, pressure PF2, PF3, increase, and the highest of these pressures is applied via the shuttle valve arrangement 120 to provide servo pressure S1. Servo pressure S1 assists the spring in valve 82 to raise the system pressure. The consequent rise in pressure DP1 increases the values of servo pressures S2 and S3 to enable throttle valves 76, 78 to maintain the increased system pressure.

At a low value of reheat fuel flow, i.e., at low values of compressor delivery pressure P2 and of angle $\theta$ of the power demand control the pressure in chamber 64 of valve 17 may become equal to the pressure PR in chamber 41 and, if in excess of pressure DP1 will urge valve 17 fully shut. Pressures PF2 and PF3 are also low. In these circumstances servo pressure S1 becomes equal to pressure PR in chamber 41 of arrangement 14. The system pressure is thereby maintained high enough to prevent pressure PR from urging control elements 62, 70, 71 in the respective metering devices 17, 18, 19 to positions in which reheat fuel flow is shut off.

The distributor arrangement 130, shown in FIG. 5 has a housing 131 with inlet ports 132, 133, 134 respectively connected with the outlet passages 84, 76a and 78a respectively of throttle valves 82, 76, 78. Associated with the respective inlet ports 132, 133, 134 are outlet passages 135, 136, 137 which respectively communicate with the primary burner 20, gutter 21 and collander 22 of the engine reheat system.

Between the inlet ports and their associated outlet passages are respective valve arrangements 138, 139, 140 which are operable to connect outlet passages 135, 136, 137 either to their associated inlet ports or to a gallery 141 which communicates via a fourth valve arrangement 142 with a low pressure drain outlet 143.

Valve arrangement 140 comprises a pair of frusto-conical seats 144, 145 in the housing 131. A dumb-bell-shaped control member 146 has part spherical end portions 147, 148 respectively engageable with seats 144, 145. Member 146 is biased by a spring 149 in a direction to engage portion 147 with seat 144 and thereby to isolate inlet port 134 from outlet passage 137. In this position of control member 146 outlet passage 137 communicates with gallery 141.

Member 146 is movable against spring 149 by an axially aligned piston 150 responsive to servo pressure PS3 in a further gallery 151 within the housing 131. Supply of pressure PS3 to gallery 151 is controlled, in a manner to be described, by sequence valve arrangement 90, and by a relay valve 160 (FIG. 1) to be described with reference to FIG. 6. Pressure PS3 is of sufficient magnitude that control element 146 is readily movable against spring 149 and the pressure in inlet port 134. Valve arrangement 140 thus has a "bang-bang" action.

Portion 147 is slidable with clearance in a sleeve 152 forming part of housing 131. Portion 148 is radially movable with respect to piston 150. Control element 146 is thus self aligned with the valve seats 144, 145.

Valve arrangements 138, 139 are substantially identical to valve arrangement 140, differing only in their dimensions. Arrangements 138, 139 are also responsive to servo pressure PS3 in gallery 151.

Valve arrangement 142 has a frusto-conical seat 153 with which a part-spherical closure member 154 is engageable. Valve arrangement 142 is biased shut by a spring 155 and is movable against spring 155 by a piston 156 in response to a servo pressure PS4, also derived via sequence valve arrangement 90.

Sequence valve 90 is shown diagrammatically in FIG. 1 and comprises a sleeve having a plurality of ports. Within the sleeve is a control element rotatable by the shaft 73 (FIGS. 1 and 2) to selectively interconnect the ports. As shown in FIG. 1 the control element has a number of metering edges which co-operate with the associated ports so as to interconnect only those ports shown associated with a particular metering location on the control element. Rotation of the control element is best considered as being in five anticlockwise steps, B to F, from an initial position A as seen in FIG. 1. Four metering locations 170, 171, 172, 173 are shown.

A high pressure source, conveniently the delivery pressure of the engine main fuel pump, is connected to ports 174, 175 at metering locations 170, 171 respectively. Ports 176, 177 at location 170 are respectively connected to passage 13 of pump 10 and to the PS2 connection of pressure control arrangement 81. Thus in positions A and B ports 174, 176 are interconnected and in positions C to F ports 176, 177 are interconnected.

A metering location 171 port 175 is connected to a port 178 in position A only, and to a port 179 in positions C to F. The pressure at port 179 provides servo pressure PS3, and that at port 178 provides servo pressure PS4. The low pressure LP referred to above is connected to ports 180, 181 at metering locations 172, 173 respectively. A further port 182, at location 172, is connected to port 178, the arrangement being such that pressure PS4 is at high pressure in position A and at low pressure in positions B to F. A port 184 at location 172 is connected to port 179 at location 170, so that pressure PS3 is a low pressure in positions A and B. A port 183 at location 173 is connected to the outlet of the pump 10, so that the pump outlet is connected to low pressure in position A only of the control element. The chamber 41 in metering arrangement 14 is permanently connected to a low pressure via a passage 185 in the sequence valve 90. The reference pressure PR is thus substantially equal to this low pressure.

The positons A to F of the shaft 73, and hence of the sequence valve control element, correspond to positions of a pilot's control lever (not shown) for the engine. Positions A and B correspond to an inoperative condition of the reheat system, movement between positions B and C corresponds to light-up or shut down of the reheat system, depending on the direction of movement, and positions D to F corresponds to different levels of reheat flow as controlled by cam 72 (FIG. 1).

Relay valve 160 is shown in FIG. 6 and comprises a housing 190 within which are a pair of axially aligned nozzles 191, 192, whose respective bores communicate via passages 193, 194 with pressures PS3 and with the gallery 141 in distributor arrangement 130. A lever 195 is pivoted in housing 190 and carries a self-aligning closure 196. Lever 195 is biased by a spring 197 so that closure 196 shuts off nozzle 191. Lever 195 is movable against spring 197 by the pressure PS3 to open nozzle 191 and shut nozzle 192. A passage 198 interconnects the inside of housing 190 with gallery 151 in arrangement 130. When pressure PS3 is sufficiently high to overcome spring 197, passages 193, 198 are interconnected and the valves in the distributor arrangement 130 are operated to supply fuel to the engine reheat system. If pressure PS3 is low gallery 151 is connected via passage 198, 194 to gallery 141, and valve arrangements 138, 139, 140 operate to shut off fuel supply to the reheat burners. If pressure PS4 falls to a low value, valve 142 opens to dump fuel within those burners via passage 143 to a drain 199.

The fuel control apparatus also includes a priming valve arrangement 200, shown in detail in FIG. 7. Arrangement 200 is connected in parallel with metering assembly 14, between the outlet of pump 10 and the inlet ports of the distributor arrangement 130. Valve arrangement 200 includes a piston-like control member 201 slidable in a cylinder 202 and biased by a spring 203 towards a stop 204. The bore of cylinder 202 communicates via a passage 205 with the inlet of pump 10.

Piston 201 has an enlarged head 206 which is subjected, via a filter 207 and a flow restrictor 208 to the pump delivery pressure PP in passage 205 to urge piston 201 against spring 203. Surrounding piston 201 within cylinder 202 are annular passages 209, 210, 211, which communicate, via respective non-return valves 212, 213, 214, and passages 215, 216, 217 with the respective inlet ports 132, 133, 134 of distributor arrangement 130. Passage 211 communicates with a side of the piston head 206 which is remote from that subjected to pressure PP.

Piston 201 has an internal blind bore which communicates with ports 218, 219, 220 in the wall of piston 201. In the extreme rightward position of piston 201 as seen in FIG. 7, ports 218, 219, 220 are clear of the respective annular passages 209, 210, 211. The permitted travel of piston 201 is such that ports 218, 219, 220 communicate with respective passages 209, 210, 211 to supply fuel to the distributor arrangement 130. In the extreme leftward position of piston 201 the ports 218, 219, 220 are again clear of the respective annular passages. In this leftward position pump delivery pressure PP communicates with a passage 221 connected to a "hot-shot" ignition device 222 (FIG. 1) of a known type.

The rate at which piston 201 moves leftward, and hence the quantity of fuel delivered to each reheat burner is dependent on the size of restrictor 208. The piston 201 is maintained in its leftward position by pump delivery pressure PP so long as the reheat system remains operative. When the reheat system is shut down pressure PP becomes effectively equal to the pressure at the pump inlet, and the piston 201 is returned to its initial position by spring 203.

Device 222 is of a known type and is responsive to pressure PP in passage 221, when servo pressure PS3 in passage 193 is high, to supply a measured quantity of fuel to nozzles 223, 224, which are respectively in the engine combustion chamber and downstream of the engine turbine, thereby applying a flame jet to the reheat burners 20, 21, 22 to ignite the reheat system.

In use, with sequence valve in position A high pressure will be applied to passage 13 of pump 10 and throttle 11 will be urged fully shut. Pressure PS4 will be high, opening gallery in distributor 130 to the drain 199. PS3 will also be low, allowing fluid in passages 135, 136, 137 to be dumped to drain 199, via valves 138, 139, 140 in distributor 130. The low value of PS3 ensures, via pressure control arrangement 81, that servo pressure PS1 is also low, and movement of throttle 11 to reduce pump delivery is not therefore opposed. The pump outlet is connected to low pressure via sequence valve 90. The reheat system is thus shut down.

When sequence valve 90 is moved to position B, pump passage 13 remains at high pressure and PS3 remains at low pressure. PS4 however, falls to a low pressure, shutting off the dump valve 142, in distributor 130. The pump outlet is also isolated from low pressure. Position B of valve 90 is thus a position prior to lighting the reheat system. Valves 138, 139, 140 and 142 are shut, and this condition may be maintained as long as required in readiness for operation of the reheat system.

When valve 90 is moved to position C, pump passage 13 is isolated from high pressure and connected to pressure control arrangement 81 to provide servo pressure PS2. Pressure PS3 becomes high, enabling pressure PS1 to rise to increase pump output pressure. Relay valve 160 is energised to apply PS3 to distributor 130 and open valves 138, 139, 140 to permit fuel flow to the reheat system. Fuel from pump 10 is delivered via passage 205 to priming device 200, from which measured quantities of fuel are discharged via passages 215, 216, 217 and distributor 130 to the respective burners 20, 21, 22.

When the priming valve arrangement 200 completes its priming operation, hot-shot device 222 is enabled, by virtue or pressure PS3 to ignite the reheat system via nozzles 223, 224. Priming arrangement 200 completes its operation during the time in which metering assembly 14 starts to deliver fuel to the reheat system.

Subsequent rotation of shaft 73 to position F by rack and pinion 74 (FIG. 2) in response the position θ of the engine power demand control, does not affect the operation of valve 90, but causes metering arrangement 14 to increase fuel flow to the engine.

FIG. 8 shows a form of priming valve arrangement, which is an alternative to that shown in FIG. 7. This alternative form has a piston control member 230 which is movable within a bore 231 against a spring 232 by pump delivery pressure PP, applied via passage 205. Annular passages 233, 234, 235 surround piston 230 within bore 231 and respectively communicate, via non-return valves 212, 213, 214, with the passages 215, 216, 217. Valves 212, 213, 214 are identical to the correspondingly numbered valves described with reference to FIG. 7. Ports 236, 237, 238 extend through the wall of piston 230, as before. A chamber 241 on the side of piston 230 remote from passage 205 communicates via a flow restrictor 239 and a non-return valve 240 with low pressure. Chamber 241 also communicates with passage 233 via a restrictor 242.

In use piston 230 is moved, as before, against spring 232 by pressure PP so that ports 236, 237, 238 move past passages 233, 234, 235 to delivery measured quantities of fuel to the reheat system. At the rightward extent of its travel piston 230 uncovers passage 221 which communicates, as before, with the "hot-shot" device 222. The rate at which piston 230 moves, and hence the quantity of fuel delivered to each burner, is dependent on the size of restrictor 242. Piston 230 is maintained in its rightward position, while pressure PP is applied to passage 205, by the low pressure in chamber 241 resulting from leakage to low pressure via non-return valve 240 and restrictor 239.

The further form of priming arrangement shown in FIG. 9 has a piston 250 movable against spring 251 by pressure PP. The rate of movement of piston 250 is dependent on the rate of flow through a restrictor 252. An annular passage 253 communicates with passage 205 and piston 250 has a single port 254 which cooperates with passage 253 to deliver a measured amount of priming fuel to the reheat burners, as before. Delivery of fuel to the burners is via the non-return valves 212, 213, 214 and respective passages 215, 216, 217 described above.

A fuel control apparatus which includes the device of FIG. 9 does not include a hot-shot ignition device 221. Instead, piston 250 includes a pair of passages 255, 256 which are respectively operable, after piston 250 has moved to complete its priming function, to connect the high pressure source to nozzle 223 in the engine, and to connect passage 205 to nozzle 224 in the engine. Connections to nozzles 223 and 224 are made via respective spring-loaded valves 257, 258. Valves 257, 258 are also biased shut by the low pressure LP.

In use after piston 250 has moved sufficiently to the right to complete the priming operation, passage 255 permits high pressure flow to nozzle 223. Piston 250 continues to move to the right, shutting off the above high pressure flow after approximately 0.25 seconds. Shortly after the high pressure flow has begun, passage 256 permits fuel at pump delivery pressure PP to flow to nozzle 224. At the extreme rightward position of piston 250 both the passages 255, 256 are clear of their associated ports and flow to nozzles 223, 224 ceases. Piston 250 is maintained in its rightward position as a result of fuel via a restrictor 258.

The alternative form of priming valve arrangement shown in FIG. 10 includes a piston-like control member 260 slidable in a cylinder 261 and biased by an extension spring 262 towards a stop 263. Pump outlet 15 communicates with cylinder 261 via passage 205 and a restrictor 264 so that the delivery pressure of pump 10 opposes spring 262. Outlet 15 also communicates with an annular passage 265 communicating with the bore of cylinder 261 and closed by member 260 when the latter is against stop 263. Member 260 has ports 266 which can communicate with passage 265 as member 260 is moved against the bias of spring 262. The permitted travel of member 260 is such that in its extreme rightward position, as seen in the drawing, ports 266 are again clear of passage 265. In this position member 260 uncovers the passage 221 which in this case interconnects cylinder 261 and the ignition device 222.

Downstream of control member 260 cylinder 261 communicates via non-return valves 212, 213, 214 with passages 215, 216, 217. The upstream side of valves 212, 213, 214 communicate, via a restrictor 267 and a further non-return valve 268, with the inlet of the pump 10. Valve 268 is such that it lifts off at a relatively low pressure.

In use, piston member 260 is moved, as before, against spring 262. Ports 266 first move into alignment, and subsequently out of alignment, with passage 265. As ports 266 move past passage 265 fuel flows via non-return valves 212, 213, 214 and respective passages 215, 216, 217 to the distributor 130. As this fuel flow increases the consequent reduction in pressure at pump outlet 15 causes throttle 11 to be moved to maintain the output flow. As ports 266 move past their midposition relative to passage 29 the pump output pressure tends to increase and is again corrected. A small amount of fuel flows back to the pump inlet via restrictor 267 and relief valve 268.

With member 260 in its rightward position, flow through passages 215, 216, 217 ceases and passage 221 is uncovered to cause device 222 to ignite the reheat system. Since there is now no flow through ports 266, the pressure immediately upstream of valves 212, 213, 214 falls to a low value. Control member 260 is thus maintained in its rightward position so long as the delivery pressure of pump 10 is sufficient to overcome spring 262. Pump delivery pressure is, in fact, maintained by the servo pressure signal in passage 12 in response to engine operating parameters as above described.

When the reheat system is shut down, the pump delivery pressure becomes effectively equal to pump inlet pressure and the member 260 is returned to its initial position by spring 262.

The arrangement shown in FIG. 10 enables a priming fuel charge to be supplied to the reheat burners substantially immediately reheat is selected, the time taken being typically less than 1 second, this time being effectively dependent on the size of restrictor 264.

I claim:

1. A fuel control apparatus for a gas turbine engine reheat system having a plurality of burners, comprising a pump, first, second and third variable metering orifices in parallel, for controlling fuel flow from said pump to first, second and third reheat burners respectively, said variable metering orifices including control members respectively positioned by first, second and third servo pressure signals, means responsive to operating parameters of the engine to derive said servo pressure signals from the pressure upstream of said metering orifices and from a reference pressure, first, second and third throttle valves between said first, second and third metering orifices respectively and the associated burners, said first, second and third throttle valves being respectively responsive to first, second and third signal pressures, means responsive to a first difference in pressure between the pressures downstream of the first and second metering orifices for generating said second signal pressure, said second signal pressure thereby actuating said second throttle valve to maintain the pressure downstream of said second metering orifice equal to the pressure downstream of said first metering orifice, means responsive to a second difference in pressure between the pressures downstream of the first and third metering orifices for generating said third signal pressure, said third signal pressure thereby actuating said third throttle valve to maintain the pressure downstream of said third metering orifice equal to the pressure downstream of said first metering orifice, means for maintaining the pressure difference across the first metering orifice substantially constant for a given engine speed, and selector means for providing said first signal pressure from whichever of the pressures downstream of said second and third throttle valves or said reference pressure is the highest.

2. An apparatus as claimed in claim 1 in which said signal pressure generating means comprises a first valve spool movable in response to the difference between the pressures downstream of the first and second metering orifices, and a second valve spool movable in response to the difference between the pressures downstream of the first and third metering orifices, said first and second valve spools respectively controlling said second and third signal pressures, an increase in the pressure downstream of said second metering orifice or a decrease in the pressure downstream of said first metering orifice acting to decrease said second signal pressure, and an increase in the pressure downstream of said third metering orifice or a decrease in the pressure downstream of said first metering orifice acting to decrease said third signal pressure.

3. An apparatus as claimed in claim 1 in which said regulating means comprises means for driving said pump at a speed proportional to the engine speed, and valve means responsive to the pump delivery pressure, to the engine speed, and to the pressure downstream of the first metering orifice to generate a fourth signal pressure, a decrease in pump delivery pressure, an increase in engine speed, or an increase in the pressure downstream of said first metering orifice acting to increase said fourth signal pressure, and a fourth throttle valve responsive to said fourth signal pressure to vary the pump delivery pressure.

4. An apparatus as claimed in claim 1 in which said selector means comprises a pair of shuttle valves, one of said shuttle valves having two inlets respectively connected to the downstream sides of said second and third throttle valves, and an outlet, and the other of said shuttle valves having two inlets respectively connected to the outlet of said one shuttle valve and to said reference pressure, and an outlet communicating with said first throttle valve, an increase in said first signal pressure in the outlet of said other shuttle valve acting to shut said first throttle valve.

* * * * *